United States Patent
Picken, Sr.

(10) Patent No.: US 9,615,696 B2
(45) Date of Patent: Apr. 11, 2017

(54) GRILL REMOVAL ASSEMBLY

(71) Applicant: Dan Picken, Sr., Pedricktown, NJ (US)

(72) Inventor: Dan Picken, Sr., Pedricktown, NJ (US)

( * ) Notice: Subject to any disclaimer, the term of this patent is extended or adjusted under 35 U.S.C. 154(b) by 0 days.

(21) Appl. No.: 14/711,887

(22) Filed: May 14, 2015

(65) Prior Publication Data

US 2016/0331184 A1    Nov. 17, 2016

(51) Int. Cl.
*F24B 15/00* (2006.01)
*A47J 45/10* (2006.01)
*A47J 37/07* (2006.01)

(52) U.S. Cl.
CPC ........... *A47J 45/10* (2013.01); *A47J 37/0786* (2013.01)

(58) Field of Classification Search
CPC ........ A47J 45/10; A47J 37/0786; A47J 36/12; F24B 15/00; F23J 1/04
USPC ....... 294/9, 10, 12, 26, 158, 92; 254/131, 21
See application file for complete search history.

(56) References Cited

U.S. PATENT DOCUMENTS

| | | | | |
|---|---|---|---|---|
| 163,659 A | * | 5/1875 | Hoyt | B25J 15/0616 294/10 |
| 1,559,976 A | * | 11/1925 | Ness | E04G 23/08 254/131 |
| 1,562,034 A | * | 11/1925 | Mieher | B65G 7/12 294/26 |
| 4,482,181 A | * | 11/1984 | Shepherd | A47J 37/0786 294/12 |
| D282,518 S | | 2/1986 | Mahoney | |
| D341,065 S | | 11/1993 | Martner | |
| 5,729,854 A | * | 3/1998 | Powers | A47J 37/0786 294/10 |
| 6,000,739 A | | 12/1999 | Zemit et al. | |
| 6,202,986 B1 | * | 3/2001 | Goldman | B66F 19/005 254/131 |
| 6,216,306 B1 | | 4/2001 | Esterson et al. | |
| 6,485,074 B1 | * | 11/2002 | Floyd | A47J 37/0786 15/236.01 |
| 7,108,304 B2 | | 9/2006 | White | |
| 7,399,016 B2 | * | 7/2008 | Barker | A47J 36/12 294/10 |
| 7,690,627 B2 | * | 4/2010 | Harpell | B66F 15/00 254/131 |
| 8,465,068 B1 | | 6/2013 | Vinson, Jr. | |
| 8,556,310 B1 | | 10/2013 | Nabors | |
| 8,740,269 B2 | | 6/2014 | Greer | |
| 8,973,194 B1 | * | 3/2015 | Caughey | A47J 43/28 294/7 |
| 2005/0088002 A1 | | 4/2005 | Dwyer | |
| 2015/0093480 A1 | * | 4/2015 | Biever | A47J 43/16 426/281 |

FOREIGN PATENT DOCUMENTS

WO    WO2013033485         3/2013
WO    WO 2013033485 A1 *   3/2013    ........ A47J 37/0786

* cited by examiner

*Primary Examiner* — Gabriela Puig

(57) ABSTRACT

A grill removal assembly removes a hot grill grate from an appliance such as a grill, smoker, oven, or the like. The assembly includes a handle has a slot and a pair of tabs. The slot may insertably receive a selected one of a rod on a grill. The tabs may be positioned beneath a central rod on the grill when the slot receives the selected rod. A stabilizer is attached to the handle. The stabilizer abuts the selected rod when the slot receives the selected rod thereby facilitating the handle to remove the grill from an oven.

1 Claim, 3 Drawing Sheets

GRILL REMOVAL ASSEMBLY

BACKGROUND OF THE DISCLOSURE

Field of the Disclosure

The disclosure relates to removal devices and more particularly pertains to a new removal device for removing a hot grill grate from an appliance such as a grill, smoker, oven or the like.

SUMMARY OF THE DISCLOSURE

An embodiment of the disclosure meets the needs presented above by generally comprising a handle has a slot and a pair of tabs. The slot may insertably receive a selected one of a rod on a grill. The tabs may be positioned beneath a central rod on the grill when the slot receives the selected rod. A stabilizer is attached to the handle. The stabilizer abuts the selected rod when the slot receives the selected rod thereby facilitating the handle to remove the grill from an oven.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
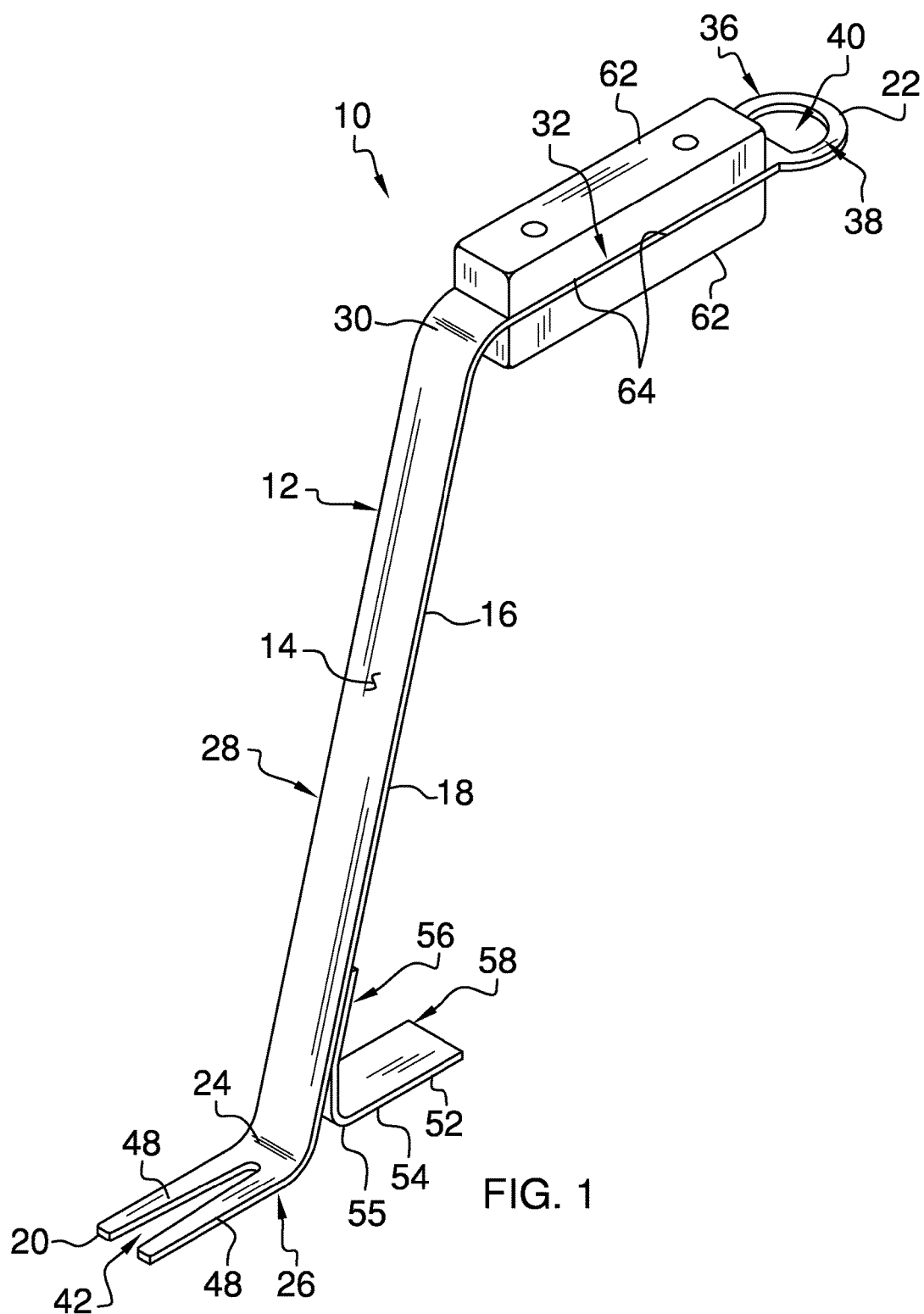
FIG. 1 is a perspective view of a grill removal assembly according to an embodiment of the disclosure.
Figure 2:
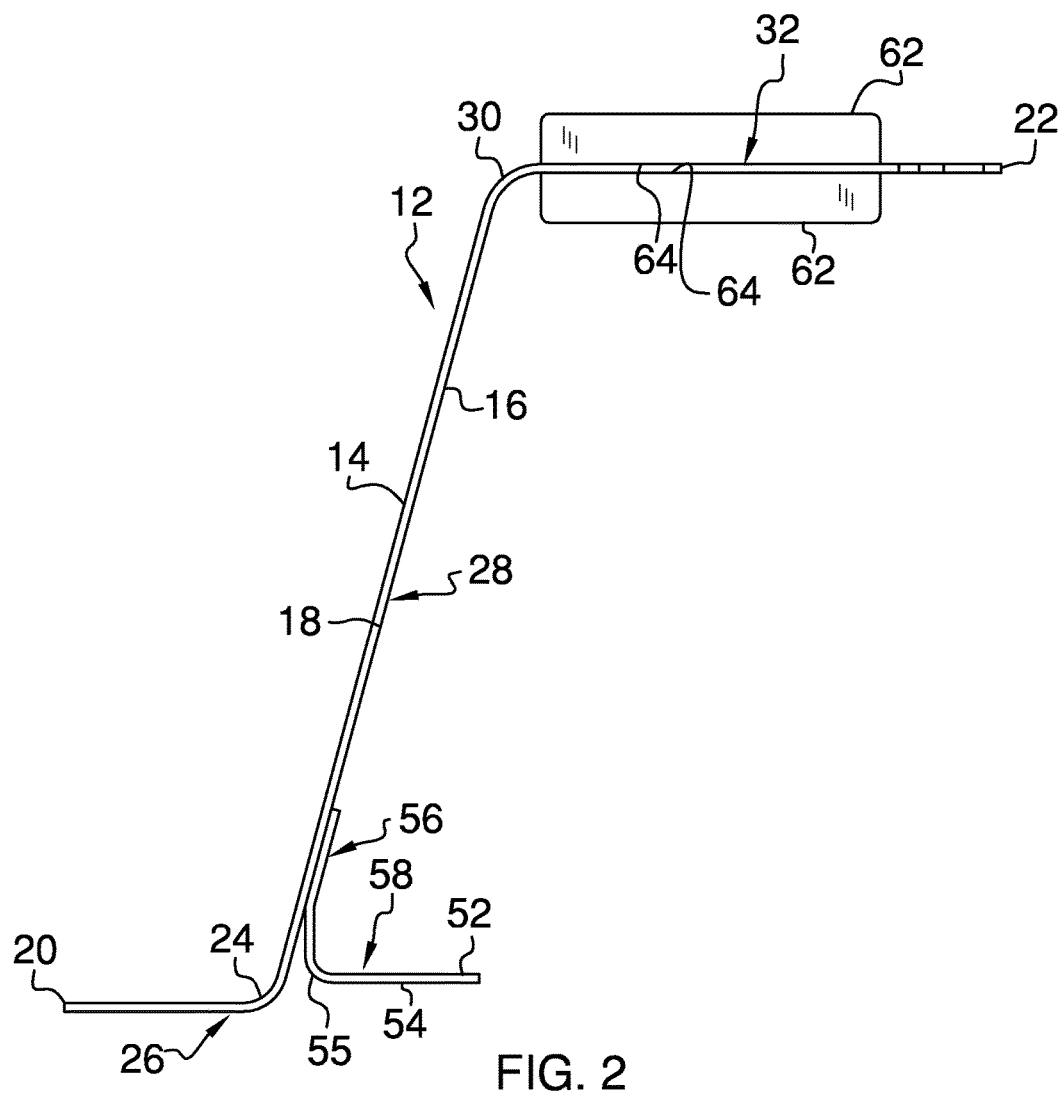
FIG. 2 is a left side view of an embodiment of the disclosure.
Figure 3:
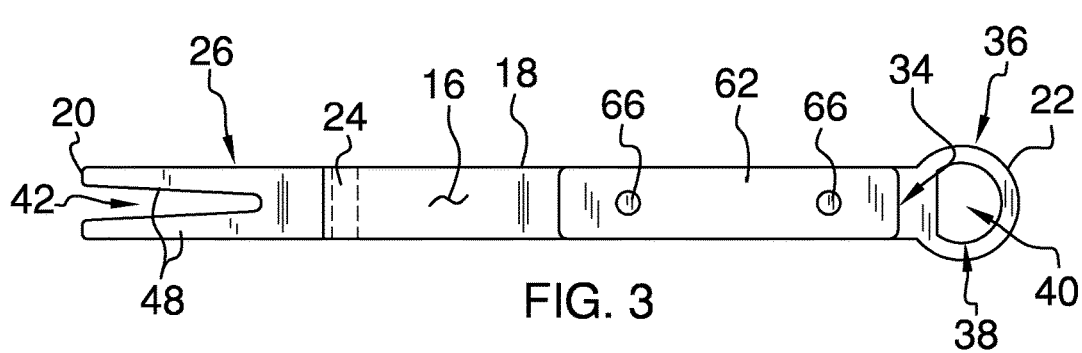
FIG. 3 is a top view of an embodiment of the disclosure.
Figure 4:
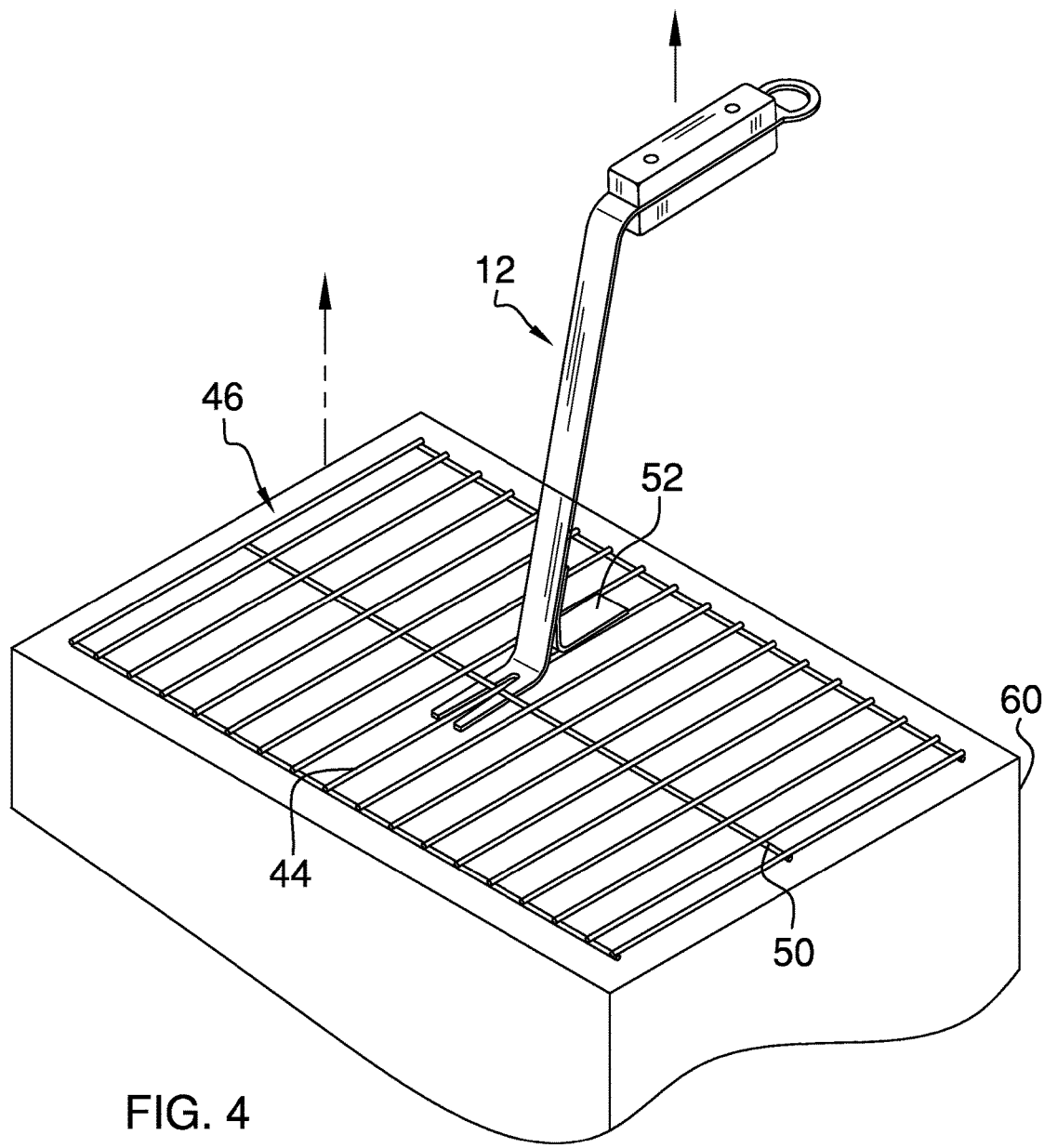
FIG. 4 is a perspective in-use view of an embodiment of the disclosure.

With reference now to the drawings, and in particular to FIGS. 1 through 4 thereof, a new removal device embodying the principles and concepts of an embodiment of the disclosure and generally designated by the reference numeral 10 will be described.

As best illustrated in FIGS. 1 through 4, the grill removal assembly 10 generally comprises a handle 12 that has a top surface 14, a bottom surface 16 and a peripheral edge 18 extending between the top surface 14 and the bottom surface 16. The peripheral edge 18 has a first side 20 and a second side 22 and the handle 12 is elongated between the first side 20 and the second side 22. The handle 12 has a first bend 24 that is positioned proximate the first side 20 to define a first portion 26 forming an angle with respect to a central portion 28. The handle 12 has a second bend 30 that is positioned closer to the second side 22 than the first side 20 to define a second portion 32 forming an angle with respect to the central portion 28. The angle between the first portion 26 and the central portion 28 is congruent with the angle between the second portion 32 and the central portion 28. The handle 12 may have a length ranging between approximately 16 inches and 20 inches.

The peripheral edge 18 curves outwardly from a center 34 of the handle 12 proximate the second side 22 to define a rounded portion 36 of the handle 12. The rounded portion 36 has an opening 38 extending through the top surface 14 and the bottom surface 16 wherein the opening 38 defines a bottle opener 40. The first side 20 has a slot 42 extending toward the first bend 24. Thus, the slot 42 may insertably receive a selected one of a rod 44 on a grill 46. The slot 42 is centrally positioned on the handle 12 to define a pair of tabs 48 and the tabs 48 may be positioned beneath a central rod 50 on the grill 46 when the slot 42 receives the selected rod 44. The grill 46 may be a cooking grill or the like that comprises a plurality of interconnected rods. The slot 42 may have a length ranging between 2 inches and 3 inches and a width ranging between ½ inch and ¾ inch.

A stabilizer 52 is attached to the handle 12 and the stabilizer 52 has a first surface 54. The stabilizer 52 has a bend 55 thereon to define a primary portion 56 and a secondary portion 58. The first surface 54 corresponding to the primary portion 56 is attached to the bottom surface 16 corresponding to the central portion 28 of the handle 12 such that the secondary portion 58 extends away from the central portion 28. The stabilizer 52 is positioned adjacent to the first bend 24 such that the first surface 54 corresponding to the secondary portion 58 is spaced upwardly from the bottom surface 16 corresponding to the first portion 26 of the handle 12. Thus, the first surface 54 corresponding to the secondary portion 58 abuts the selected rod 44 when the slot 42 receives the selected rod 44 thereby facilitating the handle 12 to remove the grill 46 from an oven 60 when the grill 46 is too hot to touch. The oven 60 may be a gas fired cooker, a charcoal fired cooker or cooking oven that utilizes the grill 46. The stabilizer 52 may have a length ranging between approximately 2 inches and 3 inches.

A pair of grips 62 is provided and each of the grips 62 is attached to the handle 12 wherein each of the grips 62 may enhance a grip of the handle 12. Each of the grips 62 has a mating surface 64 and the mating surface 64 of one of the grips 62 is attached to the bottom surface 16 corresponding to the second portion 32. The mating surface 64 of one of the grips 62 is attached to the top surface 14 corresponding to the second portion 32 and each of the grips 62 is aligned with each other. A pair of fasteners 66 extends through each of the grips 62 and engages the handle 12 thereby retaining each of the grips 62 on the handle 12. Each of the fasteners 66 may comprise a pin or the like and each of the grips 62 may be comprised of a rigid and thermally insulating material.

In use, the handle 12 is manipulated to position the selected rod 44 within the slot 42 and to position each of the tabs 48 beneath the central rod 50. The second portion 32 is tilted downwardly toward the grill 46 thereby facilitating the stabilizer 52 to engage the grill 46. The tabs 48 frictionally engage the central rod 50 thereby facilitating the handle 12 to lift the grill 46 outwardly from the oven 60. The bottle opener 40 is used in the convention of bottle openers.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A grill removal assembly configured to remove a hot grill from an oven, said assembly comprising:

a handle having a top surface, a bottom surface and a peripheral edge extending between said top surface and said bottom surface, said peripheral edge having a first side and a second side, said handle being elongated between said first side and said second side, said handle having a first bend being positioned proximate said first side to define a first portion forming an angle with respect to a central portion, said handle having a second bend being positioned closer to said second side than said first side to define a second portion forming an angle with respect to said central portion, said angle between said first portion and said central portion being congruent with said angle between said second portion and said central portion, said peripheral edge curving outwardly from a center of said handle proximate said second side to define a rounded portion of said handle, said rounded portion having an opening extending through said top surface and said bottom surface wherein said opening defines a bottle opener, said first side having a slot extending toward said first bend wherein said slot is configured to insertably receive a selected one of a rod on a grill, said slot being centrally positioned on said handle to define a pair of tabs wherein said tabs are configured to be positioned beneath a central rod on the grill when said slot receives the selected rod;

a stabilizer being attached to said handle, said stabilizer having a first surface, said stabilizer having a bend thereon to define a primary portion and a secondary portion, said first surface corresponding to said primary portion being attached to said bottom surface corresponding to said central portion of said handle such that said secondary portion extends away from said central portion, said stabilizer being positioned adjacent to said first bend such that said first surface corresponding to said secondary portion is spaced upwardly from said bottom surface corresponding to said first portion of said handle wherein said first surface corresponding to said secondary portion is configured to abut the selected rod when said slot receives the selected rod thereby facilitating said handle to remove the grill from an oven; and a pair of grips, each of said grips being attached to said handle wherein each of said grips is configured to enhance a grip of said handle, each of said grips having a mating surface, said mating surface of one of said grips being attached to said bottom surface corresponding to said second portion, said mating surface of one of said grips being attached to said top surface corresponding to said second portion, each of said grips being aligned with each other.

* * * * *